United States Patent
Kraemer (10) Patent No.: US 6,490,602 B1
(45) Date of Patent: Dec. 3, 2002

(54) METHOD AND APPARATUS FOR PROVIDING ENHANCED FUNCTIONALITY TO PRODUCT WEBPAGES

(75) Inventor: Keith M. Kraemer, Manhattan Beach, CA (US)

(73) Assignee: Wish-List.Com, Inc., Manhattan Beach, CA (US)

( * ) Notice: Subject to any disclaimer, the term of this patent is extended or adjusted under 35 U.S.C. 154(b) by 0 days.

(21) Appl. No.: 09/232,052

(22) Filed: Jan. 15, 1999

(51) Int. Cl.$^7$ ................................................ G06F 15/00
(52) U.S. Cl. ........................ 707/513; 707/501.1; 705/26
(58) Field of Search ................................. 707/513, 501, 707/500; 705/14, 26, 27

(56) References Cited

U.S. PATENT DOCUMENTS

| | | | | |
|---|---|---|---|---|
| 5,752,022 A | * | 5/1998 | Chiu et al. ..................... 707/10 |
| 5,852,717 A | * | 12/1998 | Bhide et al. ................. 709/203 |
| 5,935,207 A | * | 8/1999 | Logue et al. ............... 709/203 |
| 5,966,697 A | * | 10/1999 | Fergerson et al. .......... 235/375 |
| 5,970,472 A | * | 10/1999 | Allsop et al. ................. 705/26 |
| 5,970,474 A | * | 10/1999 | LeRoy et al. ................. 705/27 |
| 5,991,306 A | * | 11/1999 | Burns et al. ................. 370/429 |
| 6,038,601 A | * | 3/2000 | Lambert et al. ............ 370/468 |
| 6,128,644 A | * | 10/2000 | Nozaki ........................ 709/201 |
| 6,128,655 A | * | 10/2000 | Fields et al. ................. 709/219 |
| 6,185,625 B1 | * | 2/2001 | Tso et al. .................... 345/748 |
| 6,199,079 B1 | * | 3/2001 | Gupta et al. ................... 705/26 |
| 6,226,642 B1 | * | 5/2001 | Beranek et al. ............. 345/738 |
| 6,266,649 B1 | * | 7/2001 | Linden et al. ................. 705/26 |
| 6,266,681 B1 | * | 7/2001 | Guthrie ........................ 707/10 |
| 6,272,472 B1 | * | 8/2001 | Danneels et al. ............. 705/27 |
| 6,297,819 B1 | * | 10/2001 | Furst ........................... 345/329 |
| 6,298,356 B1 | * | 10/2001 | Jawahar et al. ............. 707/201 |
| 6,330,561 B1 | * | 12/2001 | Cohen et al. ................. 707/10 |
| 6,401,077 B1 | * | 6/2002 | Godden et al. ............... 705/26 |

OTHER PUBLICATIONS

Kohda, Y. et al., "Ubiquitous Advertising on The WWW: Merging Advertisement on The Browser", Computer Networks and ISDN Systems 28, (1996) pp. 1493–1499.

Doorenbos, R. B. et al., "A Scalable Comparison–Shopping Agent For the World Wide Web", Department of Computer Science and Engineering University of Washington, Feb. 5–8, 1997, pp. 39–48.

* cited by examiner

*Primary Examiner*—Stephen S. Hong
*Assistant Examiner*—Thu V. Huynh
(74) *Attorney, Agent, or Firm*—Marshall, Gerstein & Borun (57) ABSTRACT

A method and apparatus for providing enhanced functionality to product webpages is described. This method and apparatus may be used to provide a unified toolbar across product webpages of multiple, independent retailers. This toolbar may be used to create a gift registry across multiple retailers, to create an inter-retailer shopping cart and automate purchases, to create an inter-retailer advertising network, and to create a virtual network of retailers with a multitude of services spanning them.

27 Claims, 4 Drawing Sheets

METHOD AND APPARATUS FOR PROVIDING ENHANCED FUNCTIONALITY TO PRODUCT WEBPAGES

BACKGROUND OF THE INVENTION

1. Field of the Invention

The present invention relates to a method and apparatus for providing enhanced functionality to webpages. More particularly, the present invention relates to a method and apparatus for providing a unified gift registry which allows user to register and purchase gifts from multiple retailers.

2. Description of Related Art

Gift registries are often created for special occasions such as weddings. Gift-recipients visit a retailer to select and register a list of desired gifts. Gift-givers then visit the retailer to select and purchase a gift from this list. The gift is then marked as purchased and therefore no longer available for purchase by a subsequent gift-giver.

Gift registries are typically separately maintained at each store and are particular to each store. This requires both gift-recipients and gift-givers to visit the same store. Gift registries are often maintained on a single non-networked computer within the individual store to automate the bookkeeping functions.

Gift registries may also be implemented on a computer network, which provides improved access to other stores of the same retailer as well as gift-givers. For example, a private network between stores associated with the same retailer allows gift-recipients and gift-givers to visit any store which is part of the network to register or purchase gifts. As another example, a publicly accessible network such as the Internet allows gift-recipients and gift-givers to register and purchase gifts from a computer with Internet access. Such networked gift registries are currently provided by numerous individual retailers.

However, these networked gift registries are particular to each retailer and are designed to work only with stores of the same retailer, and are limited to products available in the stores of the same retailer.

Currently, gift-recipients wishing to register gifts from more than one retailer must visit each retailer, create a new registry account, and go through the oftentimes laborious process of selecting and registering gifts to be placed on their registry. This process must be repeated for every retailer involved, each process varying in number of steps and degree of difficulty. Gift-givers wishing to purchase these registered gifts must determine which stores to shop at, look up each registry, and purchase the gift through the supplying retailer. Both the gift-recipient and the gift-giver are inconvenienced by a narrower product selection, store location, inability to reconcile registry lists across multiple retailers, and the degree of effort required.

Furthermore, gift registry services offered by just one retailer often contain erroneous listings, untimely updates of product selection and purchase status, and may lead to duplicate gift purchases.

Current gift registry solutions require the retailer to offer their own registry services for their own product selection. However, it is difficult for many retailers to to carry a sufficient number of products to provide the product selection consumers often desire.

What is needed is a single gift registry service that is compatible with more than one retailer. What is needed is a gift registry solution which allows a gift-recipient to visit a single location and create a gift registry which includes products from more than one retailer. What is also needed is a gift registry solution which allows a gift-giver to visit a single location and access a gift registry which includes products from more than one retailer.

SUMMARY OF THE INVENTION

The present invention is directed towards a computer implemented method for providing enhanced functionality to product webpages. One embodiment of the method comprises: receiving a request for a product webpage from a user, the product webpage being associated with a product and an independent vendor; retrieving the product webpage from an independent source; extracting a location and structural information associated with the product webpage; modifying the product webpage to provide a toolbar, the toolbar having at least one command associated with the product; and presenting the modified product webpage to the user.

DETAILED DESCRIPTION OF THE INVENTION

The present invention provides a method and apparatus for providing enhanced functionality to webpages.

Figure 1A:
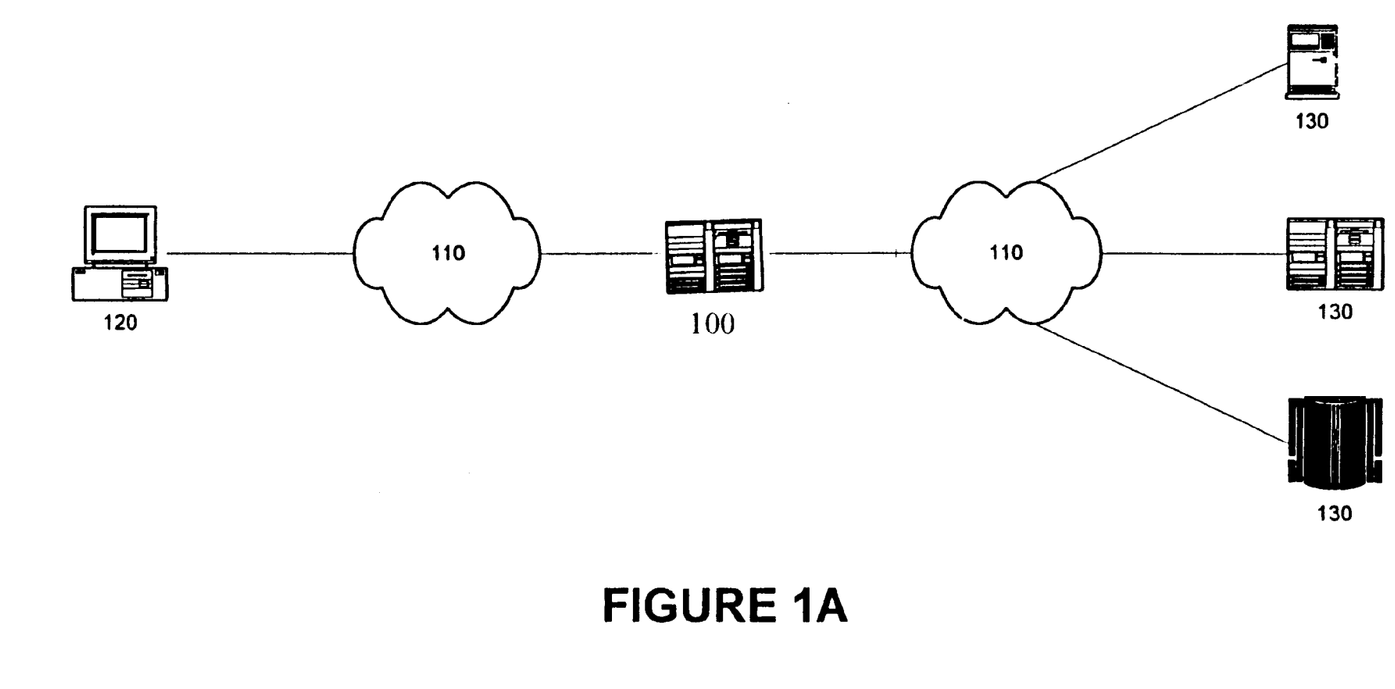
FIG. 1A shows a typical network in which the method of the present invention may be practiced.

FIG. 1A shows a typical network in which the method and apparatus of the present invention may be practiced. An enhanced functionality server 100 is connected through a wide area network 110 to client devices 120, each of which includes a browser. Enhanced functionality server 100 is also connected through wide area network 110 to a plurality of independent sources 130.

Enhanced functionality server 100 may be a more than one server. Wide area network 110 may be the Internet, a virtual private network, or other network. Client devices 120 may be a computer, a personal digital assistant, or other suitable networkable device. Independent sources 130 may be webpage servers associated with independent retailers or vendors.

A user uses client device 120 to connect to wide area network 110 and access enhanced functionality server 100. Once connected to enhanced functionality server 110, the user may use the browser to access independent sources 130 just as normal. However, enhanced functionality server 100 intercepts the transmissions between client device 120 and independent sources 130 and is capable of adding tools and services to these transmissions. Enhanced functionality server 100 thus behaves similar to a proxy server, but provides enhanced functionality. Enhanced functionality server 100 is capable of "following" the user and recording user behavior as the user access independent sources.

Figure 1B:
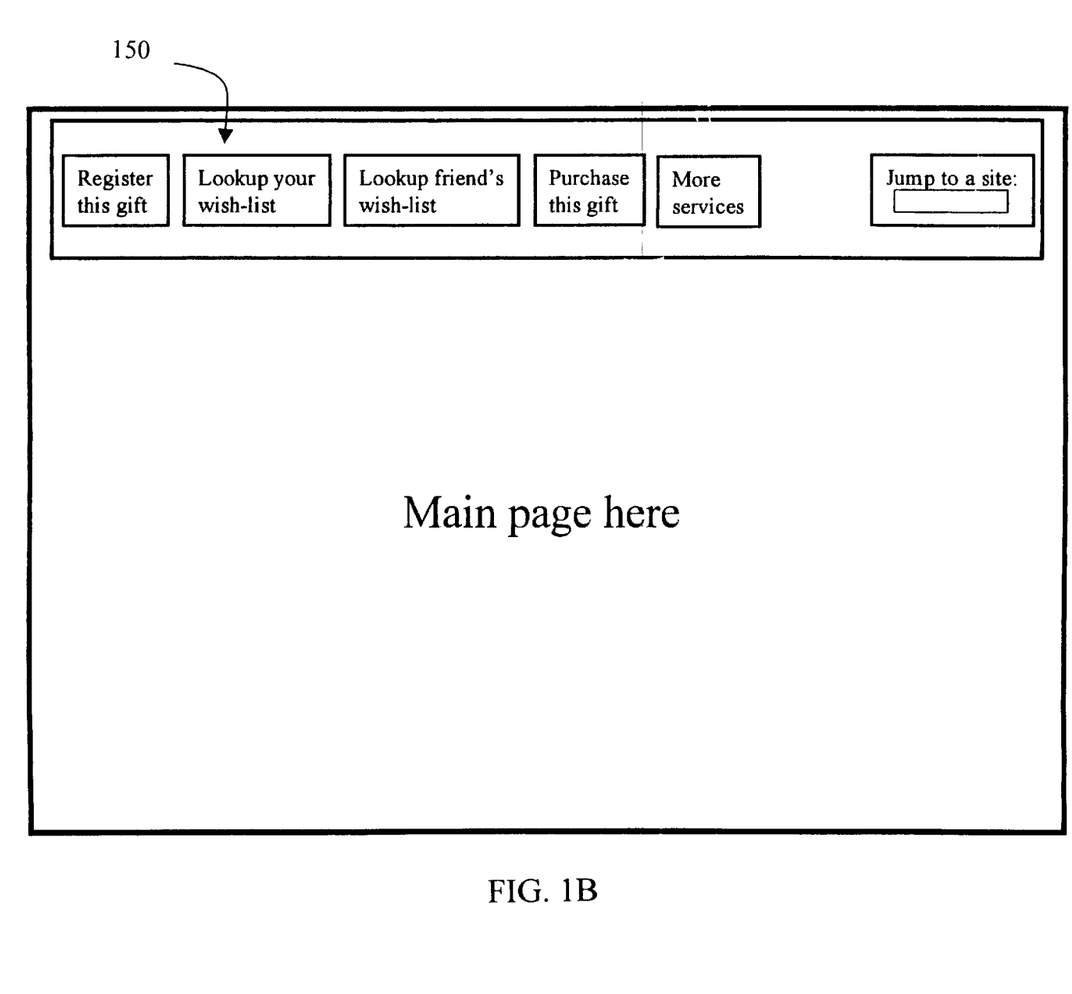
FIGS. 1B–1C show embodiments of toolbars which may be provided by the method and apparatus of the present invention.
Figure 1C:
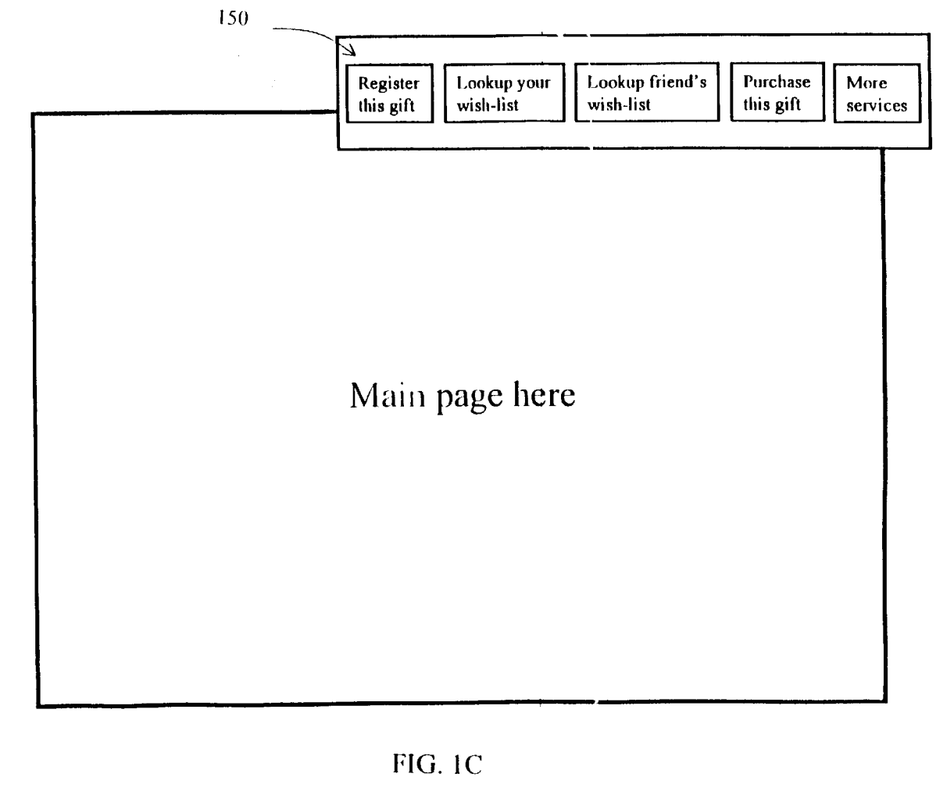

FIGS. 1B and 1C show enhanced functionality toolbars. Enhanced functionality server 100 is capable of providing a toolbar 150 which looks and behaves the same regardless of which independent source 130 the user happens to be visiting. For example, toolbar 150 may provide services such as "Purchase this product" or "Register this product". Enhanced functionality server 100 is also capable of collecting and storing information specific to a user in order to facilitate completion of these services. For example, enhanced functionality server 100 may prompt the user for name, address, and credit card information, and then automatically fill out order forms on an order page to fulfill a "Purchase this product" request.

Figure 2:
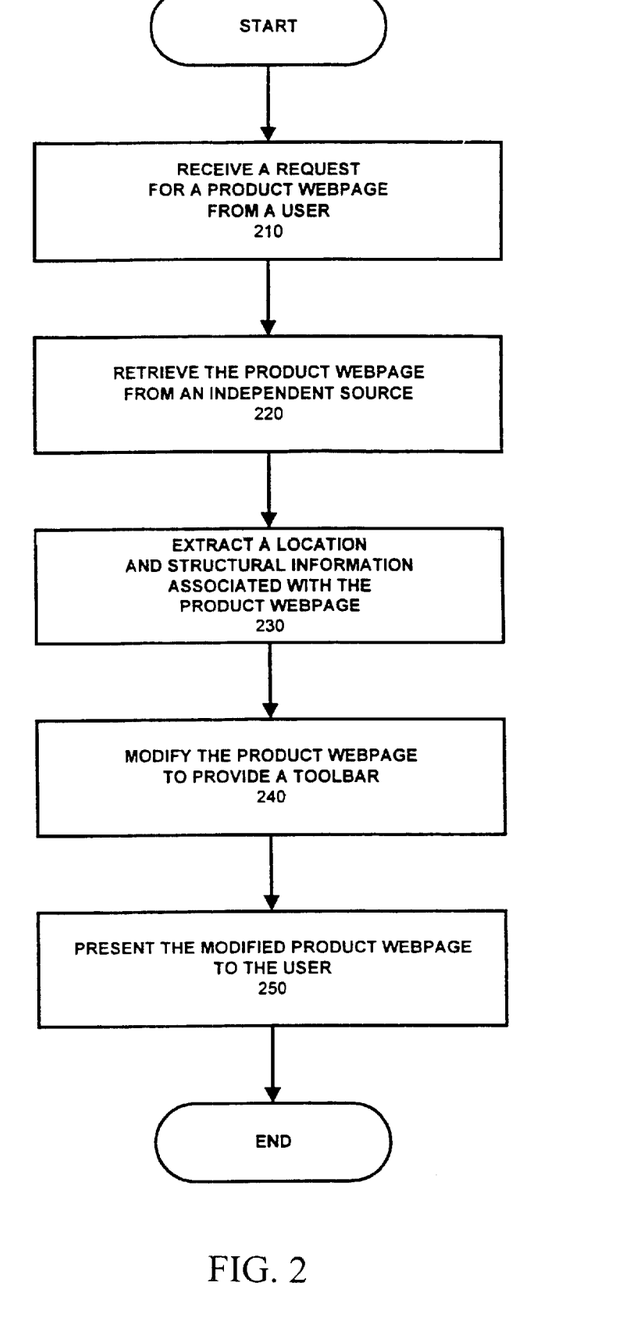
FIG. 2 shows one embodiment of a method of the present invention for providing enhanced functionality to product webpages.

FIG. 2 shows one embodiment of a method of the present invention for providing enhanced functionality to product webpages. The method includes: (1) receiving a request for a product webpage from a user, the product webpage being associated with a product and an independent vendor (block 210); (2) retrieving the product webpage from an independent source (block 220); (3) extracting a location and structural information associated with the product webpage (block 230); (4) modifying the product webpage to provide a toolbar, the toolbar having at least one command associated with the product (block 240); and (5) presenting the modified product webpage to the user (block 250).

Receiving a request for a product webpage from a user, the product webpage being associated with a product and an independent vendor (block 210). In one embodiment, enhanced functionality server 100 receives a request for a product webpage, although this request may also be processed by browser on client device 120. In an Internet environment, this request would be in the form of a URL request. The product webpage may be associated with any product and vendor. The vendor may be independent of enhanced functionality server 100, and administers its website and server independently of enhanced functionality server 100.

Retrieving the product webpage from an independent source (block 220). In an Internet environment, enhanced functionality server 100 sends the URL request and obtains the HTML form of the product webpage. Again, the product webpage may reside on a server which is administered separately and independently of enhanced functionality server 100.

Extracting a location and structural information associated with the product webpage (block 230) may include: (1) parsing the product webpage into webpage elements (block 232); (2) analyzing the webpage elements to identify location and structural information (block 234); and (3) storing the location and structural information (block 236). The product webpage may be written in a markup language such as HTML, in which case extracting may include: (1) parsing the product webpage according to HTML tags; (2) analyzing the HTML tags and accompanying text to identify URL and frameset information, and (3) storing the URL and frameset information.

Modifying the product webpage to provide a toolbar, the toolbar having at least one command associated with the product (block 240). Toolbar 150 provides enhanced functionality, such as services "Purchase this product" or "Register this product." Toolbar 150 may also provide other general functions such as "Home" and "Help". Toolbar 150 may also include a graphical presentation such as an advertisement. Toolbar 150 may be provided in a space inserted at a top, bottom, side, or any desired location in the product webpage. Toolbar 150 may actually be a part of the webpage, or provided in a separate frame or floating window. If the product webpage is written in HTML, toolbar 150 may be inserted after the <BODY> marker of the webpage, or after any other suitable marker. The toolbox window may also be configured to be always visible, allowing the user to select options from the toolbox window at any time. Toolbar 150 may be tailored specifically for the product webpage, if the product webpage is identified first by comparing its webpage elements to a database of known webpages, or toolbar 150 may be generic. Toolbar 150 may also include sponsored presentations such as advertising banners.

The method may further include: (6) obtaining information about the user (block 260); and (7) storing the information about the user in an account associated with the user (block 270).

Obtaining information about the user (block 260) may include obtaining any one or more of a name, address, phone number, credit card and payment information, personal preferences, and demographic information about the user. Storing the information about the user in an account associated with the user (block 270) may include accessing a existing account or creating a new account, and storing the information in this account. This user information may be used to facilitate future transactions such as purchasing the product. This user information may also be used to help select advertisements specifically targeted to the user.

The method may further include: (8) receiving a product registration command associated with the product from the user (block 280); (9) adding the product to a list of products in the account associated with the user (block 290); and (10) adding a location and structural information associated with the product webpage in the account associated with the user (block 2100). These three steps may also be performed before any personal information about the user is obtained.

The method may further include: (11) obtaining information about a purchaser (block 2110); (12) receiving a purchase command associated with the product from the purchaser (block 2120); (13) modifying the purchase command with the information about the purchaser (block 2130); and (14) sending the modified purchase command to the vendor (block 2140).

Enhanced functionality server 100 may include a database of vendor webpages which includes information about the purchase forms. When a purchase command is received, enhanced functionality server 100 is capable of automatically filling out the purchase forms using information obtained earlier about the purchaser. The purchase transaction is thus facilitated by enhanced functionality server 100.

Another alternate embodiment of a method for providing enhanced functionality to product webpages comprises: receiving a request for a product webpage from a user, the product webpage being associated with a product and an independent vendor; retrieving the product webpage from an independent source associated with the vendor; extracting a location and structural information associated with the product webpage; modifying the product webpage to provide a toolbar, the toolbar having at least one command associated with the product; presenting the modified product webpage to the user; receiving a subsequent request for the product webpage; presenting the product webpage using the location and the structural information associated with the product webpage; presenting the product webpage to the user.

Yet another alternate embodiment of a method for providing enhanced functionality to product webpages comprises: presenting a list of vendor webpages to a user, the vendor webpages being associated with a plurality of vendors; receiving a request for a particular vendor webpage from the user, the particular vendor webpage being associated with a particular vendor; presenting a list of product webpages to the user, the product webpages being associated with a plurality of products, the plurality of products being associated with the particular vendor; receiving a request for a particular product webpage, the particular product webpage being associated with a particular product; retrieving the particular product webpage; obtaining a location and structural information associated with the particular product webpage; modifying the particular product webpage to provide a toolbar, the toolbar having at least one command associated with the particular product; presenting the modified particular product webpage to the user; receiving the command associated with the particular product from the user; and storing information about the particular product in a list of products associated with the user.

EXAMPLE 1

This example describes how the method of the present invention may be used to allow a gift-recipient to create a gift registry such as a bridal registry. The gift-recipient is able to select and register gifts from multiple retailers, not just from a single store or chain of retailers.

Although this example uses the Internet, the present invention need not be implemented only within the context of the Internet, but may be implemented within any computer network. An Internet implementation allows both the gift-recipient and gift-buyer convenient access the registry and convenient fulfillment of requested transactions.

A gift-recipient accesses enhanced functionality server 100 and then browses vendor and product webpages normally. Enhanced functionality server 100 may present a list of retailers. The list of retailers may be a suggested or preferred list of retailers, or prepared in response to the gift-recipient's previous selections. However, the gift-recipient is also able to shop at unlisted retailers, the supplied list provided only for the gift-recipient's convenience. The gift-recipient selects a link to the retailer website of their choice by clicking on the appropriate listing as displayed on their browser. Enhanced functionality server 100 "follows" the gift-recipient and stores information about the webpages the gift-recipient has visited. The gift-recipient may request any particular product webpage.

1. Receiving a request for a product webpage from a user, the product webpage being associated with a product and an independent vendor. Enhanced functionality server 100 receives the requests for product webpages as the gift-recipient is browsing.

2. Retrieving the product webpage from an independent source.

3. Extracting a location and structural information associated with the product webpage. The product webpage is parsed into its webpage elements and analyzed. Its URL and frameset information is extracted and stored. This allows the product webpage to be reconstructed when it is subsequently requested by a gift-giver.

4. Modifying the product webpage to provide a toolbar, the toolbar having at least one command associated with the product. A toolbox is inserted at the top of the webpage, after the <BODY> marker. The toolbox includes a "Register this gift" and "Purchase this gift" buttons. Elements in the HTML code are analyzed and adjusted in preparation to be re-served from enhanced functionality server 100. References to resources on a retailer's website are adjusted so that the resulting HTML code can be served from enhanced functionality server 100 with no broken references.

5. Presenting the modified product webpage to the user. After the toolbar is provided, the product webpage earlier requested by the gift-recipient is presented to the gift-recipient.

6. Receiving a product registration command associated with the product from the user. The gift-recipient may continue browsing product webpages until a desired gift is reached. At this point, the gift-recipient may select the "Register this gift" button provided by toolbar 150.

7. Adding the product to a list of products in the account associated with the user. Sufficient information about the retailer and product are gathered and stored in an account created for the gift-recipient to enable the product to be purchased at a later date.

8. Adding a location and structural information associated with the product webpage in the account associated with the user. The URL and frameset structure of the product webpage is stored in the account.

9. Obtaining information about the user. For a new gift-recipient, enhanced functionality server 100 may present the gift-recipient with a series of forms to be filled out in order to obtain personal information including name, address, phone number, occasion date, occasion name, special requests such as product colors or product sizes, and other personal attributes.

10. Storing the information about the user in an account associated with the user. The information about the gift-recipient is added to the the gift being registered and the URL and frameset structure of the gift's webpage in the gift-recipient's account. The account may be kept private with an identification and password authentication scheme. At the completion of registering the gift, the user may be redirected back to the original product webpage where the user first selected "Register this gift" from the toolbox.

11. Obtaining information about a purchaser. A gift-giver accesses the gift-recipient's gift registry by accessing enhanced functionality server 100. Enhanced functionality server 100 may use a series of question and answer forms to obtain information about the gift-giver, such as name and credit card information, and to make sure the gift-giver accesses the proper gift-recipient's gift registry. Having positively identified and supplied the correct authentication, the gift-giver may be presented with a series of screens, the total of which displays the gift-recipient's list of registered gifts. The gift-recipient's account is displayed, along with a registry list which is a list of links, one for each gift registered by the gift-recipient. Products are listed by title offering the gift-giver a way to review each registered gift. Each listing also displays the gift's purchase status (reserved or available), and offers the gift-giver the option to view more details on the gift and to purchase the gift. The gift-giver may freely browse the product webpages, which are modified to include toolbar 150 in the same way as when the gift-recipient had browsed the product webpages. To do this, information about the selected gift, and its URL and frameset structure is retrieved from where it was stored earlier.

12. Receiving a purchase command associated with the product from the purchaser. Having reviewed a particular gift, and chosen to purchase it, the gift-giver may select the "Purchase this gift" option from the toolbar. Additional information may be obtained from the gift-giver such as the quantity being purchased.

13. Modifying the purchase command with the information about the purchaser. The information obtained earlier about the gift-giver is used to automatically fill out the necessary forms on the vendor's website to purchase the gift. Groups of elements of the webpage may be compared to a database of webpage elements as provided by participating websites. The comparison is made to find a match and therefore determine how enhanced functionality server 100 may communicate a purchase transaction, and other events, to the participating website. Otherwise, elements of the webpage may be interpreted by a linguistics algorithm to determine how to communicate a purchase transaction, or other events, to the website.

14. Sending the modified purchase command to the vendor. The original purchase request, as intercepted by enhanced functionality server, is passed on to the gift's retailer. The retailer's own sequence of purchase forms finishes the purchase transaction for the user in the normal fashion. The gift's purchase status within the gift-recipient's account is appropriately updated to inform future gift-givers and to avoid duplicate purchases for the same gift.

EXAMPLE 2

The method of the present invention may be applied to allow users browse multiple retailers and automatically submit credit card purchases to retailers, thereby increasing convenience for the user. In this example, the user may select a "Purchase this product" option from the toolbox, much the same way it is explained how users select "Register this gift". The product's webpage may be analyzed, and then the user's credit card and contact information automatically submitted to the retailer as a purchase request to complete the transaction in one automated step.

EXAMPLE 3

The method of the present invention may be used to devise a multi-retailer shopping cart, whereby the user can accumulate multiple products from independent retailers within a single virtual shopping cart. The user may select a "Purchase all products" within the toolbox to submit their credit card and contact information to all the retailers, for all the products within their shopping cart, all at once. Purchasing multiple products from multiple retailers all at once significantly increases convenience for the user.

EXAMPLE 4

The method of the present invention may be used to analyze the shopping behavior of the user, thereby recording valuable marketing information. In this example, detailed information about each page the consumer views may be analyzed, categorized, and stored as data used for marketing purposes in predicting future or related consumer behaviors, and for targeted advertising.

EXAMPLE 5

The method of the present invention may be used to create a virtual shopping agent to automate repetitive shopping tasks as learned by analyzing the user's shopping habits. For example, the process of visiting their favorite retailers and looking for similar types of products can be automated for the user. Automated shopping agents may gather information on the user's favorite product sets and retailers, may retrieve, analyze and store product webpages within the user's account, and may notify the user when prices or product availability changes. The user benefits from increased convenience via automated and personalized shopping.

EXAMPLE 6

The method of the present invention may be used to create a virtual network of retailer websites (or websites in general) with enhanced consumer services across an aggregated collection of retailers. For example, the basic utility of parsing and modifying webpages across multiple retailers allows for groups of retailer shops to be connected to each other via links within toolbox 150. Such interconnections between retailers allows for special inter-retailer promotions, and product cross selling. Purchase events within retailer A's site may trigger suggestive selling for retailer B's complementary products, whereby retailer A benefits from commissions on retailer B's sales, and retailer B benefits from increased sales volumes.

The foregoing description of the invention has been presented for purposes of illustration and description. It is not intended to be exhaustive or to limit the invention to the precise forms disclosed. Many modifications and variations will be apparent. It is intended that the scope of the invention be defined by the following claims and their equivalents.

What is claimed is:

1. A method of adding an enhanced functionality toolbar to preexisting product web pages at an intercept server, the method comprising:

receiving a request for a first product web page at the intercept server from a first user, the first product web page being associated with a first product and a first independent vendor server, the first product web page lacking the enhanced functionality toolbar;

retrieving the first product web page from the first independent vendor server to the intercept server;

adding the enhanced functionality toolbar to the first product web page at the intercept server to create a modified first product web page, the enhanced functionality toolbar including a command associated with the first product;

adjusting a first reference in the first product web page to create code in the modified first product web page that can be served from the intercept server without a first broken reference, the first reference pointing to a first resource on the first independent vendor server;

presenting the modified first product web page from the intercept server to the first user;

receiving a request for a second product web page at the intercept server from a second user, the second product web page being associated with a second product and a second independent vendor server, the second product web page lacking the enhanced functionality toolbar, the first independent server being administered by a first business entity, the second independent server being administered by a second business entity, the intercept server being administered by a third business entity, the first business entity being different than the second business entity, the first business entity being different than the third business entity, the second business entity being different than the third business entity;

retrieving the second product web page from the second independent vendor server to the intercept server;

adding the enhanced functionality toolbar to the second product web page at the intercept server to create a modified second product web page, the enhanced functionality toolbar including a command associated with the second product;

adjusting a second reference in the second product web page to create code in the modified second product web page that can be served from the intercept server without a second broken reference, the second reference pointing to a second resource on the second independent vendor server;

presenting the modified second product web page from the intercept server to the second user.

2. A method as defined in claim 1, wherein the command associated with the first product is a purchase command.

3. A method as defined in claim 1, wherein the command associated with the first product is a register command.

4. A method as defined in claim 3, further comprising adding data indicative of the first product to a list associated with the first user in response to activation of the register command.

5. A method as defined in claim 1, wherein adding the enhanced functionality toolbar to the first product web page comprises extracting location information from the first product web page.

6. A method as defined in claim 1, wherein adding the enhanced functionality toolbar to the first product web page comprises extracting structural information from the first product web page.

7. A method as defined in claim 1, wherein adding the enhanced functionality toolbar to the first product web page comprises extracting URL information.

8. A method as defined in claim 7, wherein adding the enhanced functionality toolbar to the first product web page comprises extracting frameset information.

9. A method as defined in claim 1, further comprising identifying the first product web page by comparing the web page elements of the first product web page to a database of known web pages.

10. A method as defined in claim 9, further comprising tailoring the enhanced functionality toolbar to the first product web page based on the identity of the first product web page.

11. A method as defined in claim 9, further comprising automatically filling out a purchaser form associated with the first independent vendor server based on the identity of the first product web page.

12. A method as defined in claim 1, further comprising automatically filling out a purchaser form associated with the first independent vendor server.

13. A method as defined in claim 1, wherein adding the enhanced functionality toolbar to the first product web page comprises adding at least one word at the top of the first product web page to create the modified first product web page, the at least one word representing at least one command option associated with the first product.

14. An intercept server apparatus structured to add an enhanced functionality toolbar to preexisting product web pages, the intercept server apparatus comprising a networked computing device programmed to:

receive a request for a first product web page at the intercept server from a first user, the first product web page being associated with a first product and a first independent vendor server, the first product web page lacking the enhanced functionality toolbar;

retrieve the first product web page from the first independent vendor server to the intercept server;

add the enhanced functionality toolbar to the first product web page at the intercept server to create a modified first product web page, the enhanced functionality toolbar including a command associated with the first product;

present the modified first product web page from the intercept server to the first user;

receive a request for a second product web page at the intercept server from a second user, the second product web page being associated with a second product and a second independent vendor server, the second product web page lacking the enhanced functionality toolbar, the first independent server being administered by a first business entity, the second independent server being administered by a second business entity, the intercept server being administered by a third business entity, the first business entity being different than the second business entity, the first business entity being different than the third business entity, the second business entity being different than the third business entity;

retrieve the second product web page from the second independent vendor server to the intercept server;

add the enhanced functionality toolbar to the second product web page at the intercept server to create a modified second product web page, the enhanced functionality toolbar including a command associated with the second product; and present the modified second product web page from the intercept server to the second user.

15. An intercept server apparatus as defined in claim 14, wherein the networked computing device is further programmed to adjust a reference in the first product web page to create code in the modified first product web page that can be served from the intercept server without the reference being a broken reference, the reference pointing to a resource on the first independent vendor server.

16. An intercept server apparatus as defined in claim 14, wherein the networked computing device is further programmed to adjust a plurality of hyperlinks in the first product web page to create corresponding hyperlinks in the modified first product web page that point to the intercept server.

17. An intercept server apparatus as defined in claim 14 wherein the command associated with the first product is a purchase command.

18. An intercept server apparatus as defined in claim 14, wherein the command associated with the first product is a register command.

19. An intercept server apparatus as defined in claim 18, wherein the networked computing device is further programmed to add data indicative of the first product to a list associated with the first user in response to activation of the register command.

20. An intercept server apparatus as defined in claim 14, wherein adding the enhanced functionality toolbar to the first product web page comprises extracting location information from the first product web page.

21. An intercept server apparatus as defined in claim 14, wherein adding the enhanced functionality toolbar to the first product web page comprises extracting structural information from the first product web page.

22. An intercept server apparatus as defined in claim 14, wherein adding the enhanced functionality toolbar to the first product web page comprises extracting URL information.

23. An intercept server apparatus as defined in claim 22, wherein adding the enhanced functionality toolbar to the first product web page comprises extracting frameset information.

24. An intercept server apparatus as defined in claim 14, wherein the networked computing device is further programmed to identify the first product web page by comparing the web page elements of the first product web page to a database of known web pages.

25. An intercept server apparatus as defined in claim 24, wherein the networked computing device is further programmed to tailor the enhanced functionality toolbar to the first product web page based on the identity of the first product web page.

26. An intercept server apparatus as defined in claim 24, wherein the networked computing device is further programmed to automatically fill out a purchaser form associated with the first independent vendor server based on the identity of the first product web page.

27. An intercept server apparatus as defined in claim 14, wherein the networked computing device is further programmed to automatically fill out a purchaser form associated with the first independent vendor server.

* * * * *